United States Patent
Sakuma et al.

(10) Patent No.: US 11,400,432 B2
(45) Date of Patent: Aug. 2, 2022

(54) SILICOTITANATE MOLDED BODY, PRODUCTION METHOD THEREOF, ADSORBENT FOR CESIUM AND/OR STRONTIUM COMPRISING SILICOTITANATE MOLDED BODY, AND DECONTAMINATION METHOD FOR RADIOACTIVE WASTE SOLUTION BY USING ADSORBENT

(71) Applicants: EBARA CORPORATION, Tokyo (JP); NIPPON CHEMICAL INDUSTRIAL CO., LTD., Tokyo (JP)

(72) Inventors: Takashi Sakuma, Tokyo (JP); Makoto Komatsu, Tokyo (JP); Takeshi Izumi, Tokyo (JP); Shinsuke Miyabe, Tokyo (JP); Takeshi Sakamoto, Tokyo (JP); Eiji Noguchi, Tokyo (JP); Kaori Sugihara, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 395 days.

(21) Appl. No.: 16/628,154

(22) PCT Filed: Jul. 3, 2018

(86) PCT No.: PCT/JP2018/025253
§ 371 (c)(1),
(2) Date: Jan. 2, 2020

(87) PCT Pub. No.: WO2019/009301
PCT Pub. Date: Jan. 10, 2019

(65) Prior Publication Data
US 2020/0129956 A1 Apr. 30, 2020

(30) Foreign Application Priority Data

Jul. 5, 2017 (JP) .............................. JP2017-131809

(51) Int. Cl.
| B01J 20/10 | (2006.01) |
| B01J 20/06 | (2006.01) |
| B01J 20/08 | (2006.01) |
| B01J 20/28 | (2006.01) |
| B01J 20/30 | (2006.01) |
| G21F 9/16  | (2006.01) |

(52) U.S. Cl.
CPC .............. B01J 20/10 (2013.01); B01J 20/06 (2013.01); B01J 20/08 (2013.01); B01J 20/28042 (2013.01); B01J 20/3007 (2013.01); G21F 9/162 (2013.01)

(58) Field of Classification Search
CPC ... B01J 20/10; B01J 20/06; B01J 20/08; B01J 20/28042; B01J 20/3007; G21F 9/162
USPC .......................................................... 588/10
See application file for complete search history.

(56) References Cited

U.S. PATENT DOCUMENTS

| 5,925,284 A | 7/1999 | Sherman et al. |
| 2014/0178282 A1 | 6/2014 | Kani et al. |
| 2015/0306594 A1 | 10/2015 | Mori et al. |
| 2016/0107140 A1 | 4/2016 | Miyabe et al. |

FOREIGN PATENT DOCUMENTS

| JP | 2000-015001 A | 1/2000 |
| JP | 5285183 B1 | 9/2013 |
| JP | 2013-246145 A | 12/2013 |
| JP | 5696244 B1 | 4/2015 |
| JP | 2016-102053 A | 6/2016 |
| WO | 2017-115683 A1 | 7/2017 |
| WO | 2017-141931 A1 | 8/2017 |

OTHER PUBLICATIONS

Extended European Search Report issued in Patent Application No. EP 18 82 7800 dated Jun. 23, 2020.
Medvedev, Dmitri, et al., "Crystallization of Sodium Titanium Silicate with Sitinakite Topology: Evolution from the Sodium Nonatitanate Phase", Chemistry of Materials, vol. 16, No. 19, Aug. 13, 2004, pp. 3659-3666.
Ban, Yasutoshi, et al., "Adsorption Properties of Cs by Inorganic Adsorbents in Sodium Chloride Solution", JAEA-Research, 2011-037, Division of Fuels and Material Engineering Nuclear Science and Engineering Directorate, Jan. 2012, Japan.
"Basic Data on Contaminated Liquid Water Treatment or Fukushima Daiichi NPS (CLWT)" dated 2011, https://nuce.aesj.or.jp/clwt:start accessed Nov. 26, 2019.
Chen, Tzuyu, "Immobilisation of caesium from crystalline silicotitanate by hot isostatic pressing", Ph.D. Thesis, University of Birmingham [online], 2012, retrieved on Apr. 28, 2017, retrieved from the internet: <URL:http://etheses.bham.ac.uk/3712/>, in particular pp. 79-90.

(Continued)

Primary Examiner — Edward M Johnson
(74) Attorney, Agent, or Firm — Pearne & Gordon LLP

(57) ABSTRACT

Provided are a silicotitanate molded body having high strength and reduced generation of fine powder, a production method thereof, an adsorbent comprising the silicotitanate molded body, and a decontamination method of radioactive cesium and/or radioactive strontium by using the adsorbent. The silicotitanate molded body comprises: crystalline silicotitanate particles that have a particle size distribution in which 90% or more, on volume basis, of the particles have a particle size within a range of 1 μm or more and 10 μm or less and that are represented by a general formula of $A_2Ti_2O_3(SiO_4)\cdot nH_2O$ wherein A represents one or two alkali metal elements selected from Na and K, and n represents a number of 0 to 2; and an oxide of one or more elements selected from the group consisting of aluminum, zirconium, iron, and cerium.

21 Claims, 7 Drawing Sheets

(56) References Cited

OTHER PUBLICATIONS

Chitra, S, et al., "Optimization of Nb-substituion and Cs+/Sr+2 ion exchange in crystalline silicotitanates (CST)", Journal of Radioanalytical and Nuclear Chemistry, May 12, 2012, vol. 295, No. 1, pp. 607-613.
International Search Report Issued in Patent Application No. PCT/JP2018/025253 dated Sep. 25, 2018.
Written Opinion Issued in Patent Application No. PCT/JP2018/025253 dated Sep. 25, 2018.

SILICOTITANATE MOLDED BODY, PRODUCTION METHOD THEREOF, ADSORBENT FOR CESIUM AND/OR STRONTIUM COMPRISING SILICOTITANATE MOLDED BODY, AND DECONTAMINATION METHOD FOR RADIOACTIVE WASTE SOLUTION BY USING ADSORBENT

TECHNICAL FIELD

The present invention relates to a silicotitanate molded body, a production method thereof, and the use thereof. In particular, the present invention relates to a silicotitanate molded body usable as an adsorbent for removing radioactive cesium and/or radioactive strontium in a waste solution that is generated within a nuclear power plant and that also contains competing ions originated from seawater and so forth as well as relates to a production method thereof, an adsorbent comprising the silicotitanate molded body, and a decontamination method by using the adsorbent.

BACKGROUND ART

The Fukushima Daiichi Nuclear Power Plant Accident caused by the Great East Japan Earthquake on Mar. 11, 2011 has been generating huge amount of radioactive waste solutions containing radionuclides. Such radioactive waste solutions include: contaminated water generated from cooling water that has been poured into the reactor pressure vessels, reactor containment vessels, and spent fuel pools; trench water accumulated inside trenches; subdrain water pumped up from wells called subdrain installed around the reactor buildings; groundwater; and seawater (hereinafter, referred to as "radioactive waste solutions"). From these radioactive waste solutions, radioactive substances are removed at treatment facilities, called SARRY (Simplified Active Water Retrieve and Recovery System, for cesium removal), ALPS (Advanced Liquid Processing System, for multi-nuclide removal), and so forth, and treated water is collected in tanks.

Examples of substances that are capable of selectively adsorbing and removing radioactive cesium include ferrocyanide compounds, such as Prussian blue; mordenite, which is a type of zeolites; aluminosilicates, and titanium silicate (CST). To remove radioactive cesium, for example, SARRY uses IE-96 from UOP LLC, which is an aluminosilicate, and IE-911 from UOP LLC, which is CST. Meanwhile, examples of substances that are capable of selectively adsorbing and removing radioactive strontium include natural zeolites, synthetic zeolite A and X, titanates, and CST. To remove radioactive strontium, for example, ALPS uses a titanate adsorbent.

According to "Basic Data on Contaminated Liquid Water Treatment for Fukushima Daiichi NPS (CLWT)" (Non Patent Literature (NPL) 1) published by the Division of Nuclear Fuel Cycle and Environment of the Atomic Energy Society of Japan, it is reported concerning the cesium and strontium adsorption performance of IE-910 from UOP LLC, which is powder CST, and IE-911 from UOP LLC, which is bead CST, that the powder CST exhibits adsorption capacity for radioactive cesium and strontium whereas the bead CST exhibits high adsorption performance for cesium but low adsorption performance for strontium.

Moreover, it is also reported that a modified CST obtained through surface treatment of a titanium silicate compound by bringing into contact with an aqueous sodium hydroxide solution having a sodium hydroxide concentration within a range of 0.5 mol/L or more to 2.0 mol/L achieves cesium removal efficiency of 99% or higher and strontium removal efficiency of 95% or higher (Patent Literature (PTL) 1).

Powder CST can be used for a treatment method by coagulation and sedimentation, for example, but is unsuitable for a method adopted by SARRY and ALPS of passing water to be treated through a column packed with an adsorbent.

To improve strontium adsorption performance of granular CST, the treatment and operation disclosed in PTL 1 and NPL 2 have been investigated. However, such treatment and operation pose a problem in which increased costs result due to a large amount of chemicals needed.

For this reason, there is a need for a treatment method of a radioactive waste solution that eliminates cumbersome treatment or operation, that exhibits high adsorption performance for both cesium and strontium, and that uses granular CST suitable for flow treatment in an adsorption column. Meanwhile, CST is heat sensitive and thus undergoes the compositional change upon strong heating. Consequently, the cesium and strontium adsorption capacity deteriorates. In the case of a zeolite molded body, the strength of the molded body is enhanced by using a binder, such as clay minerals, and firing at 500° C. or higher and 800° C. or lower. As mentioned above, however, CST cannot be fired since the adsorption capacity deteriorates upon strong heating. Accordingly, CST needs to be formed without strong heating.

Further, it has been reported that sodium ions tend to suppress ion-exchange reactions between radioactive cesium and CST (NPL 2). Accordingly, there is a problem of low removal performance of radioactive cesium and radioactive strontium from seawater, which has a high sodium ion concentration.

To enhance adsorption performance for cesium and strontium from seawater containing sodium ions, the present inventors have proposed an adsorbent for cesium and strontium, comprising: at least one selected from crystalline silicotitanates represented by the general formulae: $Na_4Ti_4Si_3O_{16} \cdot nH_2O$, $(Na_xK_{(1-x)})_4Ti_4Si_3O_{16} \cdot nH_2O$ and $K_4Ti_4Si_3O_{16} \cdot nH_2O$ wherein x represents a number of more than 0 and less than 1 and n represents a number of 0 to 8; and at least one selected from titanate salts represented by the general formulae: $Na_4Ti_9O_{20} \cdot mH_2O$, $(Na_yK_{(1-y)})_4Ti_9O_{20} \cdot mH_2O$ and $K_4Ti_9O_{20} \cdot mH_2O$ wherein y represents a number of more than 0 and less than 1 and m represents a number of 0 to 10 as well as a production method thereof (PTL 2). Despite high adsorption capacity for cesium or strontium, this adsorbent has low strength as a molded body and is brittle, thereby generating a lot of fine powder under wet conditions. Accordingly, washing with a large amount of water is required before use. Moreover, there was a concern that the adsorbent could be crushed under external loads, such as friction and flow pressure.

Further, a silicotitanate molded body useful for adsorption and removal treatment of cesium or strontium in seawater and in groundwater has been proposed. The silicotitanate molded body is obtained by drying powder containing one or more oxides selected from the group consisting of silica, alumina, zirconia, and tungsten oxide as inorganic binders as well as silicotitanate having the sitinakite structure, followed by forming (PTL 3). As described hereinafter as a Comparative Example, however, there is a problem in which the molded body obtained by this method generates a lot of fine powder.

CITATION LIST

Patent Literature

PTL 1: Japanese Patent No. 5285183
PTL 2: Japanese Patent No. 5696244
PTL 3: Japanese Unexamined Patent Application Publication No. 2016-102053

Non Patent Literature

NPL 1: "Basic Data on Contaminated Liquid Water Treatment for Fukushima Daiichi NPS (CLWT)" http://www-.nuce-aesj.org/projects:clwt:start
NPL 2: JAEA—Research 2011—037

SUMMARY OF INVENTION

Technical Problem

An object of the present invention is to provide a silicotitanate molded body having high strength and reduced generation of fine powder, a production method thereof, an adsorbent for radioactive cesium and/or radioactive strontium comprising the silicotitanate molded body, and a decontamination method of radioactive cesium and/or radioactive strontium by using the adsorbent.

Solution to Problem

According to the present invention, a silicotitanate molded body having high strength and reduced generation of fine powder; a production method thereof; an adsorbent for radioactive cesium and/or radioactive strontium comprising the silicotitanate molded body; and a decontamination method of radioactive cesium and/or radioactive strontium by using the adsorbent are provided. Specific embodiments are as follows.

[1] A silicotitanate molded body comprising: crystalline silicotitanate particles that have a particle size distribution in which 90% or more, on volume basis, of the particles have a particle size within a range of 1 μm or more and 10 μm or less and that are represented by a general formula of $A_2Ti_2O_3(SiO_4).nH_2O$ wherein A represents one or two alkali metal elements selected from Na and K, and n represents a number of 0 to 2; and an oxide of one or more elements selected from the group consisting of aluminum, zirconium, iron, and cerium.

[2] The silicotitanate molded body according to [1], further comprising niobium.

[3] The silicotitanate molded body according to [1] or [2], wherein the silicotitanate molded body has a compressive strength at failure of 5.0 N or more.

[4] The silicotitanate molded body according to any one of [1] to [3], wherein a content of the oxide of one or more elements selected from the group of aluminum, zirconium, iron, and cerium is 20 wt % or less.

[5] The silicotitanate molded body according to any one of [1] to [4], wherein the molded body has a cylindrical shape having an average diameter within a range of 300 μm or more and 3,000 μm or less.

[6] An adsorbent for cesium and/or strontium, comprising the silicotitanate molded body according to any one of [1] to [5].

[7] A decontamination method of a radioactive waste solution, comprising bringing the adsorbent for cesium and/or strontium according to [6] into contact with a waste solution containing radioactive cesium and/or radioactive strontium.

[8] The decontamination method of a radioactive waste solution according to [7], comprising bringing the radioactive waste solution into contact with the adsorbent in a column flow mode at a linear velocity LV of 2 m/h or more and 40 m/h or less and a space velocity SV of 10 $h^{-1}$ or more and 300 $h^{-1}$ or less.

[9] A production method of the silicotitanate molded body according to any one of [1] to [5], comprising: extruding a mixture containing crystalline silicotitanate that has a particle size distribution in which 90% or more, on volume basis, of particles have a particle size within a range of 1 μm or more and 10 μm or less and that is represented by a general formula of $A_2Ti_2O_3(SiO_4).nH_2O$ wherein A represents one or two alkali metal elements selected from Na and K, and n represents a number of 0 to 2 and an oxide of one or more elements selected from the group consisting of aluminum, zirconium, iron, and cerium to form a molded body; and subsequently drying the molded body.

Advantageous Effects of Invention

According to the present invention, a silicotitanate molded body having high strength and reduced generation of fine powder is provided. Due to high compressive strength at failure and reduced generation of fine powder, the silicotitanate molded body of the present invention is useful for an adsorbent to be packed in columns. The silicotitanate molded body of the present invention exhibits particularly excellent adsorption capacity for cesium and/or strontium and is thus suitable for decontamination of a radioactive waste solution containing radioactive cesium and/or radioactive strontium, especially for decontamination using columns.

DESCRIPTION OF EMBODIMENTS

Figure 1:
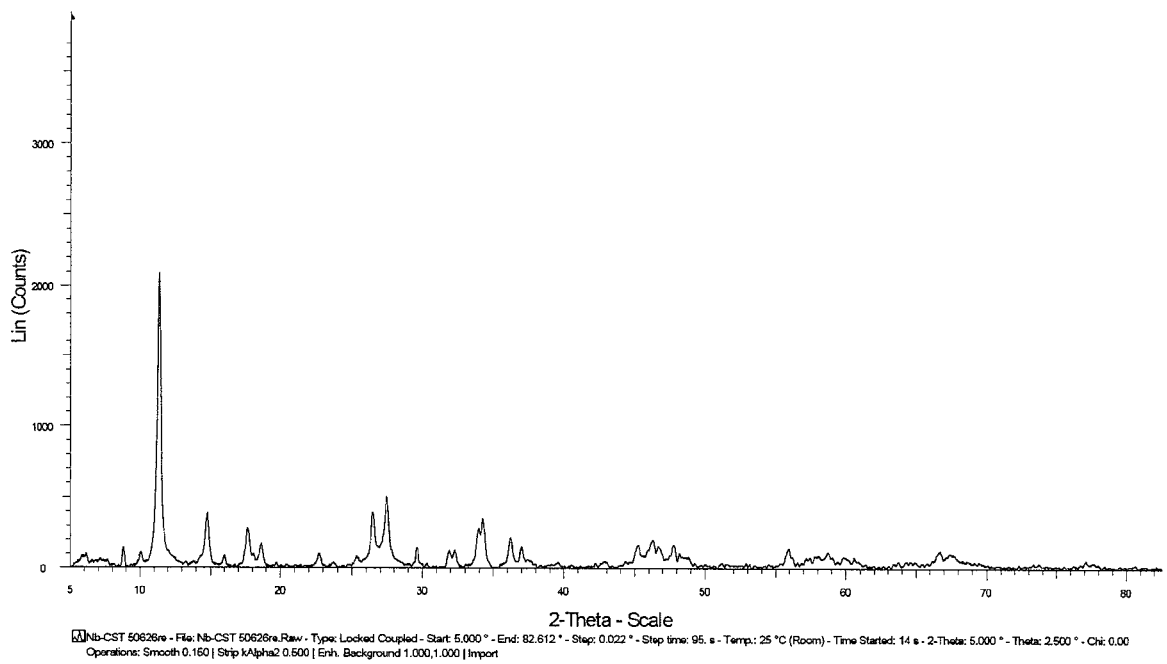
FIG. 1 is an X-ray diffraction chart for the crystalline silicotitanate used in Examples 1 to 8 and Comparative Examples 1 to 4.
Figure 2:
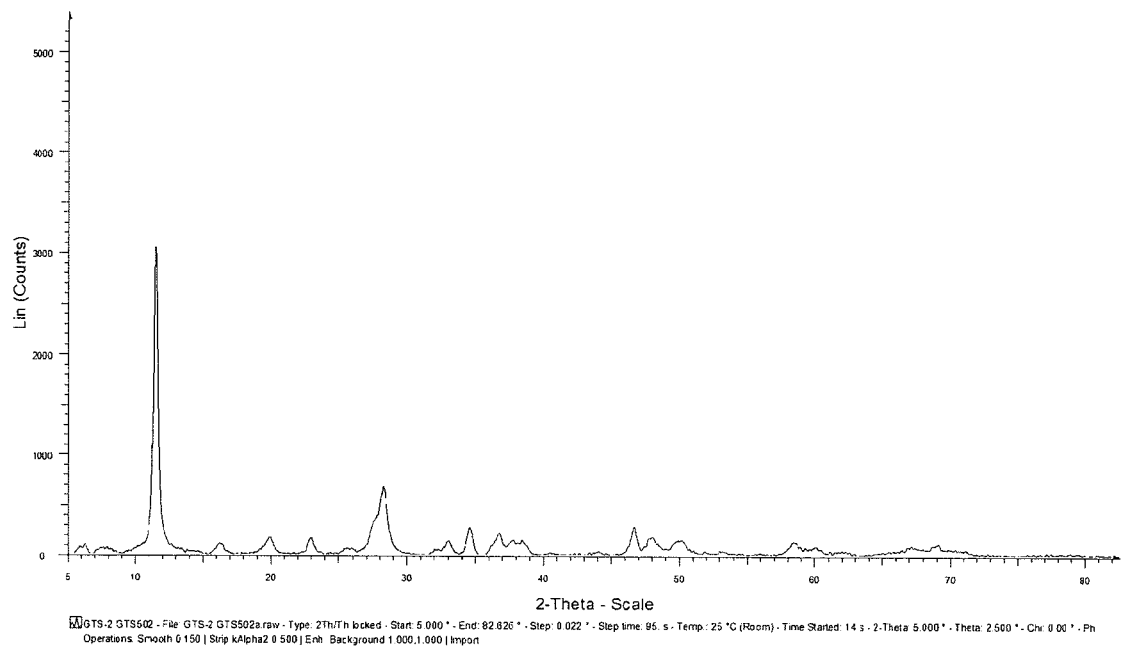
FIG. 2 is an X-ray diffraction chart for the crystalline silicotitanate used in Comparative Examples 5 and 6.

The present invention provides a silicotitanate molded body comprising: crystalline silicotitanate particles that have a particle size distribution in which 90% or more, on volume basis, of the particles have a particle size within a range of 1 μm or more and 10 μm or less and that are represented by a general formula of $A_2Ti_2O_3(SiO_4).nH_2O$ wherein A represents one or two alkali metal elements selected from Na and K, and n represents a number of 0 to 2; and an oxide of one or more elements selected from the group consisting of aluminum, zirconium, iron, and cerium.

The term "crystalline silicotitanate" according to the present invention indicates that the main peak is detected in the 2θ range of 10° or more and 13° or less in X-ray diffraction analysis with a Cu—Kα source. Preferably, a peak is also detected in any one or more 2θ ranges of 14° or more and 16° or less, 25° or more and 28° or less, 26° or more and 29° or less, and 33° or more and 36° or less.

In the silicotitanate molded body of the present invention, the content of the crystalline silicotitanate is preferably 80 wt % or more, more preferably 85 wt % or more and 99.9 wt % or less, and particularly preferably 90 wt % or more and 99.9 wt % or less.

The silicotitanate molded body of the present invention reduces particles released therefrom since the crystalline silicotitanate before extrusion forming has an extremely narrow particle size distribution in which 90% or more, on volume basis, of the particles have a particle size in the range of 1 μm or more and 10 μm or less and preferably 95% or more of the particles have a particle size in the range of 1 μm or more and 10 μm or less; or 90% or more, on volume basis, of the particles have a particle size in the range of 2 μm or more and 10 μm or less and preferably 95% or more of the particles have a particle size in the range of 2 μm or more and 10 μm or less, and consequently, such crystalline silicotitanate can yield a dense molded body.

The silicotitanate molded body of the present invention preferably further comprises niobium. Niobium (Nb) is basically and preferably contained in the form of partial substitution of titanium (Ti) in the crystalline silicotitanate.

The oxide of one or more elements selected from the group consisting of aluminum, zirconium, iron, and cerium are contained in an amount of preferably 20 wt % or less and more preferably 0.1 wt % or more and 10 wt % or less relative to the silicotitanate molded body. The oxide of one or more elements selected from the group consisting of aluminum, zirconium, iron, and cerium, which is contained in the silicotitanate molded body of the present invention, can be confirmed by detecting the characteristic peak of each oxide in X-ray diffraction analysis with a Cu—Kα source.

When niobium is further contained, the content of niobium as $Nb_2O_5$ is 2 wt % or more, preferably 5 wt % or more and 20 wt % or less, and particularly preferably 10 wt % or more and 20 wt % or less relative to the crystalline silicotitanate.

The silicotitanate molded body of the present invention preferably has a compressive strength at failure of 5.0 N or more, preferably 8.0 N or more, and more preferably 10 N or more; and 25 N or less, preferably 20 N or less, and more preferably 15 N or less. Within the above ranges, the silicotitanate molded body is neither broken during column packing nor crushed under liquid pressure during column flow treatment and is thus particularly suitably used as an adsorbent for flow treatment of huge amount of liquids.

The silicotitanate molded body of the present invention preferably has a cylindrical shape having an average diameter in the range of 300 μm or more and 3,000 μm or less. The average diameter is more preferably in the range of 400 μm or more and 2,000 μm or less and particularly preferably in the range of 500 μm or more and 1,000 μm or less. Within the above ranges, it is possible to realize the packing pressure and packing density during column packing within preferable ranges that are required to maintain a good balance between adsorption performance and pressure drop. Moreover, the silicotitanate molded body is easily produced.

According to the present invention, an adsorbent for radioactive cesium and/or radioactive strontium comprising the above-described silicotitanate molded body is also provided. The adsorbent of the present invention may further comprise one or more other components selected from ion-exchange resins, ion-exchange fibers, chelating resins, chelating fibers, calcium alginate, chitosan, iron oxide, iron hydroxide, activated carbon, silver zeolite, silver compounds, hydrotalcite, geopolymers, silicates, titanium oxide, silica gel, amorphous aluminum silicate, zeolites, titanates, amorphous silicotitanate, manganese oxide, manganates, ferrocyanide compounds, hydroxyapatite, magnesium oxide, magnesium hydroxide, cerium oxide, cerium hydroxide, zirconium oxide, and zirconium hydroxide.

According to the present invention, a decontamination method of a radioactive waste solution, comprising bringing the above-described adsorbent for radioactive cesium and/or radioactive strontium into contact with a radioactive waste solution containing radioactive cesium and/or radioactive strontium is also provided. As the decontamination method of a radioactive waste solution of the present invention, also provided is a decontamination method of a radioactive waste solution, comprising bringing the radioactive waste solution into contact with the adsorbent in a column flow mode at a linear velocity LV of 2 m/h or more and 40 m/h or less, preferably LV of 5 m/h or more and 30 m/h or less, and more preferably LV of 10 m/h or more and 20 m/h or less; and a space velocity SV of 10 $h^{-1}$ or more and 300 $h^{-1}$ or less, preferably SV of 15 $h^{-1}$ or more and 200 $h^{-1}$ or less, and more preferably 20 $h^{-1}$ or more and 50 $h^{-1}$ or less. The adsorbent of the present invention exhibits high compressive strength in addition to high adsorption capacity for cesium and strontium. Accordingly, the adsorbent can perform stable decontamination for a long period of time without easily adsorption breakthrough in treatment of a large amount of radioactive waste solutions at high linear velocity and space velocity.

Further, according to the present invention, also provided is a production method of the silicotitanate molded body, comprising: extruding a mixture containing crystalline silicotitanate particles that have a particle size distribution in which 90% or more, on volume basis, of the particles have a particle size in the range of 1 μm or more and 10 μm or less and preferably 95% or more of the particles have a particle size in the range of 1 μm or more and 10 μm or less; or 90% or more, on volume basis, of the particles have a particle size in the range of 2 μm or more and 10 μm or less and preferably 95% or more of the particles have a particle size in the range of 2 μm or more and 10 μm or less and that are represented by a general formula of $A_2Ti_2O_3(SiO_4).nH_2O$ wherein A represents one or two alkali metal elements selected from Na and K, and n represents a number of 0 to 2 as well as an oxide of one or more elements selected from the group consisting of aluminum, zirconium, iron, and cerium to form a molded body; and subsequently drying the molded body. The preparation method of the crystalline silicotitanate is not particularly limited, but the crystalline silicotitanate is preferably obtained by mixing a silicic acid source, an alkali metal compound, a niobium source, titanium tetrachloride, and water to yield a niobium-containing mixed gel and subjecting the resulting niobium-containing mixed gel to hydrothermal reactions under pressurized conditions in an autoclave at 120° C. or higher and 200° C. or lower and preferably 140° C. or higher and 200° C. or lower for 6 hours or more and 100 hours or less and preferably 12 hours or more and 80 hours or less. Before the hydrothermal reactions, the niobium-containing mixed gel is more preferably aged at 20° C. or higher and 100° C. or lower and preferably 20° C. or higher and 70° C. or lower for 0.5 hour or more and 2 hours or less under atmospheric pressure.

EXAMPLES

Hereinafter, the present invention will be further specifically described by means of Examples and Comparative Examples.
[Preparation of Silicotitanate Formed Bodies]
(1) First Step A mixed aqueous solution was obtained by mixing and stirring 115 g of Sodium Silicate 3 (from Nippon Chemical Industrial Co., Ltd., $SiO_2$: 28.96%, $Na_2O$: 9.37%, $H_2O$: 61.67%, $SiO_2/Na_2O$=3.1), 670.9 g of 25% caustic soda aqueous solution (industrial 25% sodium hydroxide, NaOH: 25%, $H_2O$: 75%), and 359.1 g of deionized water. To the mixed aqueous solution, 25.5 g of niobium hydroxide ($Nb_2O_5$: 76.5% by mass) was added and mixed with stirring, and subsequently, 412.3 g of titanium tetrachloride aqueous solution (from Osaka Titanium technologies Co., Ltd., 36.48% aqueous solution) was continuously added by a Perista pump over 0.5 hour, thereby producing a niobium-containing mixed gel. The gel was aged after addition of the titanium tetrachloride aqueous solution by sitting still at room temperature (25° C.) for 1 hour.
(2) Second Step The niobium-containing mixed gel obtained in the first step was placed in an autoclave, heated to 160° C. over 1 hour, and reacted under stirring with this temperature maintained for 18 hours. The slurry after reaction was filtered. The filtration residue was dried, subjected to X-ray diffraction analysis, and confirmed to be the crystalline silicotitanate represented by the general formula of $A_2Ti_2O_3(SiO_4)$ $\cdot nH_2O$ where A represents one or two alkali metal elements selected from Na and K, and n represents a number of 0 to 2 (FIG. 1).

Example 1

Figure 3:
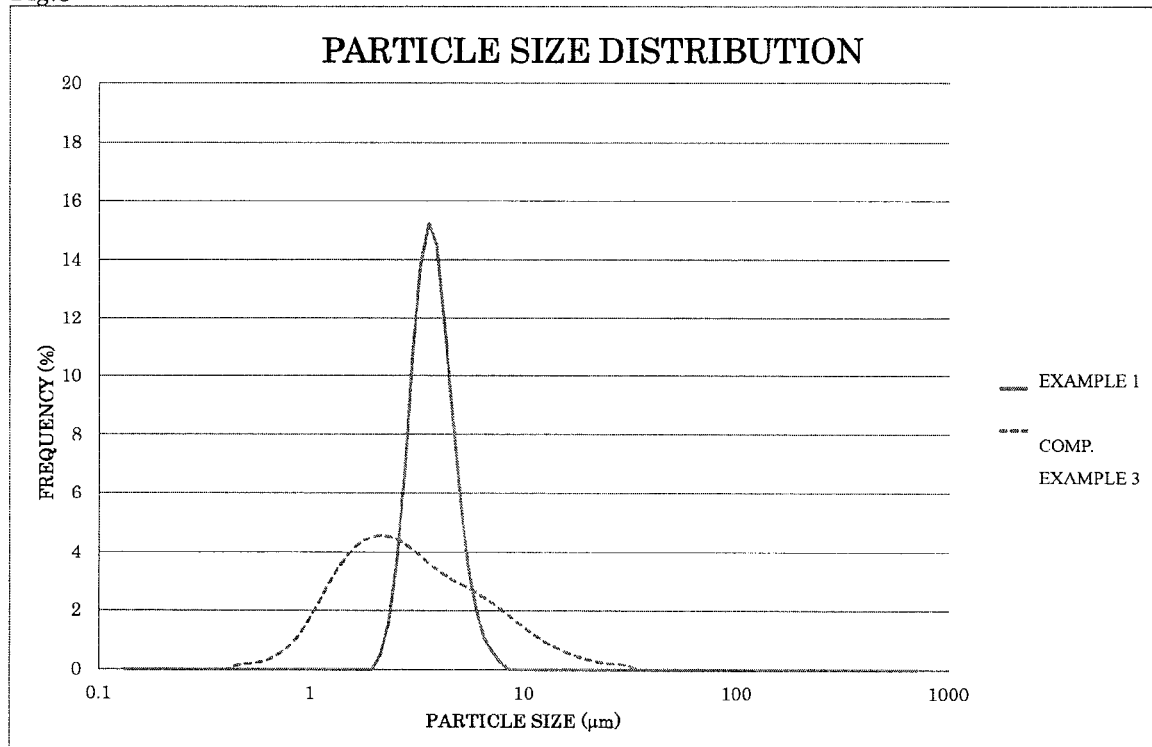
FIG. 3 is a graph showing a particle size distribution of the silicotitanate in a wet cake in Example 1 in contrast to a particle size distribution of the dry powder before extrusion forming in Comparative Example 3.

A wet cake (in Examples 2 to 8 and Comparative Examples 1 to 4 hereinafter, simply referred to as "wet cake after filtration") that was obtained after filtration and before drying in the above-described second step and that contained the crystalline silicotitanate represented by the general formula of $A_2Ti_2O_3(SiO_4)\cdot nH_2O$ wherein A represents one or two alkali metal elements selected from Na and K, and n represents a number of 0 to 2 was added with 1.0 wt % of aluminum oxide relative to the crystalline silicotitanate, extrusion-molded into 0.8 mm-diameter cylindrical shapes; subsequently dried; and classified into a range of 425 μm or more and 840 μm or less, thereby yielding silicotitanate molded bodies. The obtained silicotitanate molded bodies were measured for the compressive strength at failure and the amount of generated fine powder. In addition, the particle size distribution of the silicotitanate particles in the wet cake is shown in FIG. 3.

Example 2

A wet cake after filtration obtained in the above-described second step was added with 1.0 wt % of aluminum oxide relative to the crystalline silicotitanate, extrusion-molded into 0.6 mm-diameter cylindrical shapes; subsequently dried; and classified into a range of 300 μm or more and 710 μm or less, thereby yielding silicotitanate molded bodies. The obtained silicotitanate molded bodies were measured for the compressive strength at failure and the amount of generated fine powder.

Example 3

A wet cake after filtration obtained in the above-described second step was added with 1.0 wt % of aluminum oxide relative to the crystalline silicotitanate, extrusion-molded into 1.0 mm-diameter cylindrical shapes; subsequently dried; and classified into a range of 500 μm or more and 1,000 μm or less, thereby yielding silicotitanate molded bodies. The obtained silicotitanate molded bodies were measured for the compressive strength at failure and the amount of generated fine powder.

Example 4

A wet cake after filtration obtained in the above-described second step was added with 1.0 wt % of aluminum oxide relative to the crystalline silicotitanate, extrusion-molded into 1.2 mm-diameter cylindrical shapes; subsequently dried; and classified into a range of 840 μm or more and 1,400 μm or less, thereby yielding silicotitanate molded bodies. The obtained silicotitanate molded bodies were measured for the compressive strength at failure and the amount of generated fine powder.

Example 5

A wet cake after filtration obtained in the above-described second step was added with 0.5 wt % of aluminum oxide and 10.0 wt % of zirconium oxide relative to the crystalline silicotitanate, extrusion-molded into 0.5 mm-diameter cylindrical shapes; subsequently dried; and classified into a range of 300 μm or more and 600 μm or less, thereby yielding silicotitanate molded bodies. The obtained silicotitanate molded bodies were measured for the compressive strength at failure and the amount of generated fine powder.

Example 6

A wet cake after filtration obtained in the above-described second step was added with aluminum oxide and a binder (silica sol), extrusion-molded into 1.0 mm-diameter cylindrical shapes; subsequently dried; and classified into a range of 500 μm or more and 1,000 μm or less, thereby yielding silicotitanate molded bodies. The obtained silicotitanate molded bodies were measured for the compressive strength at failure and the amount of generated fine powder.

Example 7

A wet cake after filtration obtained in the above-described second step was added with 1.0 wt % of aluminum oxide relative to the crystalline silicotitanate, extrusion-molded into 0.8 mm-diameter cylindrical shapes; subsequently dried; pulverized; and classified into a range of 425 μm or more and 840 μm or less, thereby yielding silicotitanate molded bodies. The obtained silicotitanate molded bodies were measured for the compressive strength at failure and the amount of generated fine powder.

Example 8

A wet cake after filtration obtained in the above-described second step was added with 1.0 wt % of aluminum oxide relative to the crystalline silicotitanate, extrusion-molded into 0.6 mm-diameter cylindrical shapes; subsequently dried; pulverized; and classified into a range of 425 μm or more and 840 μm or less, thereby yielding silicotitanate molded bodies. The obtained silicotitanate molded bodies were measured for the compressive strength at failure and the amount of generated fine powder.

Comparative Example 1

A wet cake after filtration obtained in the above-described second step was extrusion-molded into 0.8 mm-diameter cylindrical shapes without being added with aluminum oxide and the like; subsequently dried; and classified into a range of 425 μm or more and 840 μm or less, thereby yielding silicotitanate molded bodies. The obtained silicotitanate molded bodies were measured for the compressive strength at failure and the amount of generated fine powder.

Comparative Example 2

A wet cake after filtration obtained in the above-described second step was extrusion-molded into 0.6 mm-diameter cylindrical shapes without being added with aluminum oxide and the like; subsequently dried; and classified into a range of 300 μm or more and 710 μm or less, thereby yielding silicotitanate molded bodies. The obtained silicotitanate molded bodies were measured for the compressive strength at failure and the amount of generated fine powder.

Comparative Example 3

A wet cake after filtration obtained in the above-described second step was dried and pulverized. The resulting powder was mixed with water and a binder (silica sol); extrusion-molded into 1.0 mm-diameter cylindrical shapes; dried; and classified into a range of 500 μm or more and 2,000 μm or less, thereby yielding silicotitanate molded bodies. The obtained silicotitanate molded bodies were measured for the compressive strength at failure and the amount of generated fine powder. In addition, the particle size distribution of the powder obtained by drying and pulverizing the wet cake after filtration is shown in FIG. 3.

Comparative Example 4

The silicotitanate molded bodies prepared in Comparative Example 3 were further pulverized and classified into a range of 600 μm or more and 1,400 μm or less. The resulting silicotitanate molded bodies were measured for the compressive strength at failure and the amount of generated fine powder.

Comparative Example 5

(1) First Step
A mixed aqueous solution was obtained by mixing and stirring 60 g of Sodium Silicate 3 (from Nippon Chemical Industrial Co., Ltd., $SiO_2$: 28.96%, $Na_2O$: 9.37%, $H_2O$: 61.67%, $SiO_2/Na_2O$=3.1), 224.3 g of 25% caustic soda aqueous solution (industrial 25% sodium hydroxide, NaOH: 25%, $H_2O$: 75%), 34.6 g of 85% caustic potash (solid reagent potassium hydroxide, KOH: 85%), and 82.5 g of pure water. To the mixed aqueous solution, 203.3 g of titanium tetrachloride aqueous solution (from Osaka Titanium technologies Co., Ltd., 36.48% aqueous solution) was continuously added by a Perista pump over 0.5 hour, thereby producing a mixed gel. The mixed gel was aged after addition of the titanium tetrachloride aqueous solution by sitting still at room temperature (25° C.) for 1 hour.

(2) Second Step
The mixed gel obtained in the first step was placed in an autoclave, heated to 170° C. over 1 hour, and reacted under stirring with this temperature maintained for 96 hours. The slurry after reaction was filtered, thereby obtaining a wet cake containing crystalline silicotitanate (general formula: $A_4Ti_4Si_3O_{16} \cdot nH_2O$).

The wet cake was extrusion-molded into 0.6 mm-diameter cylindrical shapes and classified into a range of 300 μm or more and 710 μm or less, thereby yielding silicotitanate molded bodies. The obtained silicotitanate molded bodies were measured for the compressive strength at failure and the amount of generated fine powder.

Comparative Example 6

The wet cake obtained in Comparative Example 5 was extrusion-molded into 0.6 mm-diameter cylindrical shapes; dried; subsequently pulverized; and classified into a range of 300 μm or more and 710 μm or less. The resulting silicotitanate molded bodies were measured for the compressive strength at failure and the amount of generated fine powder.

[X-Ray Diffraction]
X-ray diffraction: D8 Advance S from Bruker Corporation was used.

A Cu—Kα source was used. The measurement conditions were set to tube voltage of 40 kV, tube current of 40 mA, and scanning rate of 0.1°/sec.

[Measurement of Particle Size Distribution]
The particle size distribution was measured as volume distribution by using a laser diffraction/scattering-type particle size distribution analyzer (Microtrac MT 3300EXII from MicrotracBEL Corp.). A measurement sample was prepared as pretreatment by dispersing a sample in water, adding sodium hexametaphosphate into the resulting dispersion, and treating with ultrasonic waves for 2 minutes. The measurement conditions were set to particle refractive index of 1.81 and solvent refractive index of 1.333.

[Measurement of Compressive Strength at Failure]
One of the prepared silicotitanate molded bodies was measured for the compressive strength at failure by using a compression tester TCD 200 (DFGS 10) from John Chatillon & Sons Inc. In the same operation, twenty silicotitanate molded bodies were measured for the compressive strength at failure, and an average was calculated.

[Measurement of the Amount of Generated Fine Powder]
A glass column with an inner diameter of 30 mm was filled with 350 mL of the prepared silicotitanate molded bodies at the layer height of 50 cm. Through this column, pure water was passed upward at a flow rate of 0.3 L/min to spread out the silicotitanate molded body layer. Water was each collected at the column outlet when water in an amount of 10 times (3.5 L), 20 times (7.0 L), or 30 times (10.5 L), respectively, the amount of the silicotitanate molded bodies was passed through and measured, with a turbidimeter, for turbidity as the amount of generated fine powder.

[Measurement of the Amount of Adsorbed Cesium and Strontium]
Quantitative analysis of cesium-133 and strontium-88 was performed by using an inductively coupled plasma mass spectrometer (ICP-MS), Agilent 7700x model from Agilent Technologies. Each sample was diluted 1,000 times with dilute nitric acid and analyzed as a 0.1% nitric acid matrix. As standard samples, aqueous solutions each containing 0.05 ppb, 0.5 ppb, 1.0 ppb, 5.0 ppb, and 10.0 ppb of strontium, as well as aqueous solutions each containing 0.005 ppb, 0.05 ppb, 0.1 ppb, 0.5 ppb, and 1.0 ppb of cesium were used.

TABLE 1

Measurement Result

| | Added oxide | Shape | Compressive strength at failure [N] | Turbidity as amount of generated fine powder [—] Amount of water | | | Amount of adsorbed Cs [mg/mL] | Amount of adsorbed Sr [mg/mL] |
|---|---|---|---|---|---|---|---|---|
| | | | | 10 times | 20 times | 30 times | | |
| Ex. 1 | $Al_2O_3$ | Cylindrically molded | 13.5 | 11 | 7 | <1 | >17.0 | 3.0 |
| Ex. 2 | $Al_2O_3$ | Cylindrically molded | 8.6 | 12 | 6 | 5 | >18.4 | 3.2 |
| Ex. 3 | $Al_2O_3$ | Cylindrically molded | 11.2 | 15 | 12 | 7 | >17.2 | 2.3 |
| Ex. 4 | $Al_2O_3$ | Cylindrically molded | 7.5 | 17 | 10 | 5 | >17.1 | 1.5 |
| Ex. 5 | $Al_2O_3$, $ZrO_2$ | Cylindrically molded | 8.1 | 13 | 6 | <1 | >14.3 | 3.2 |
| Ex. 6 | $Al_2O_3$ | Cylindrically molded | 6.2 | 6 | <1 | <1 | >20.2 | 4.0 |
| Ex. 7 | $Al_2O_3$ | Pulverized after extrusion | 10.8 | 11 | 7 | <1 | >21.0 | 3.7 |
| Ex. 8 | $Al_2O_3$ | Pulverized after extrusion | 9.4 | 17 | 5 | <1 | >19.7 | 3.7 |
| Comp. Ex. 1 | — | Cylindrically molded | 1.36 | 9 | <1 | <1 | >19.7 | 3.5 |
| Comp. Ex. 2 | — | Cylindrically molded | 0.96 | 17 | 5 | <1 | >15.5 | 2.6 |
| Comp. Ex. 3 | — | Cylindrically molded | 13.6 | 60 | 30 | 21 | >18.1 | 1.8 |
| Comp. Ex. 4 | — | Pulverized | 13.1 | 60 | 31 | 26 | >16.4 | 2.1 |
| Comp. Ex. 5 | — | Cylindrically molded | 2.5 | 50 | 27 | 18 | >18.1 | 1.3 |
| Comp. Ex. 6 | — | Pulverized | 1.6 | 206 | 37 | 14 | >18.1 | 1.3 |

As shown in Examples 1 to 6 of Table 1, the silicotitanate molded bodies exhibit a high compressive strength at failure and a reduced amount of generated fine powder, where the silicotitanate molded bodies are obtained by: incorporating aluminum oxide and/or zirconium oxide into a wet cake of the crystalline silicotitanate represented by the general formula of $A_2Ti_2O_3(SiO_4) \cdot nH_2O$ wherein A represents one or two alkali metal elements selected from Na and K, and n represents a number of 0 to 2: extrusion-molding the wet cake; followed by drying.

Moreover, as shown in Examples 7 and 8, it is revealed that a high compressive strength at failure and a reduced amount of generated fine powder are achieved even when a wet cake of the crystalline silicotitanate is added with aluminum oxide and/or zirconium oxide, extrusion-molded into cylindrical shapes, subsequently dried, and further pulverized.

In contrast, as shown in Comparative Examples 1 and 2, the silicotitanate molded bodies exhibit a reduced amount of generated fine powder but a low compressive strength at failure, where the silicotitanate molded bodies are obtained by: extrusion-molding a wet cake of the crystalline silicotitanate represented by the general formula of $A_2Ti_2O_3(SiO_4) \cdot nH_2O$ wherein A represents one or two alkali metal elements selected from Na and K, and n represents a number of 0 to 2 without incorporating aluminum oxide or zirconium oxide; followed by drying.

Moreover, as shown in Comparative Examples 3 and 4, it is revealed that the silicotitanate molded bodies exhibit a high compressive strength at failure but a large amount of generated fine powder, where the silicotitanate molded bodies are obtained by: drying a wet cake of the crystalline silicotitanate represented by the general formula of $A_2Ti_2O_3(SiO_4) \cdot nH_2O$ wherein A represents one or two alkali metal elements selected from Na and K, and n represents a number of 0 to 2 without incorporating aluminum oxide or zirconium oxide; subsequently pulverizing; and further extrusion-molding.

Further, as shown in Comparative Examples 5 and 6, the silicotitanate molded bodies exhibit a low compressive strength at failure and a large amount of generated fine powder, where the silicotitanate molded bodies are obtained by: extrusion-molding a wet cake of the crystalline silicotitanate represented by the general formula of $A_4Ti_4Si_3O_{16} \cdot nH_2O$ wherein A represents one or two alkali metal elements selected from Na and K, and n represents a number of 0 to 2 without incorporating aluminum oxide or zirconium oxide; followed by drying.

Example 9

[Preparation of Simulated Contaminated Seawater 1]

An aqueous solution with a salt concentration of 0.03 wt % was prepared by using a chemical for artificial seawater production, MARINE ART SF-1 from Osaka Yakken Co., Ltd. (sodium chloride: 22.1 g/L, magnesium chloride hexahydrate: 9.9 g/L, calcium chloride dihydrate: 1.5 g/L, anhydrous sodium sulfate: 3.9 g/L, potassium chloride: 0.61 g/L, sodium hydrogen carbonate: 0.19 g/L, potassium bromide: 96 mg/L, borax: 78 mg/L, anhydrous strontium chloride: 13 mg/L, sodium fluoride: 3 mg/L, lithium chloride: 1 mg/L, potassium iodide: 81 µg/L, manganese chloride tetrahydrate:

0.6 µg/L, cobalt chloride hexahydrate: 2 µg/L, aluminum chloride hexahydrate: 8 µg/L, ferric chloride hexahydrate: 5 µg/L, sodium tungstate dihydrate: 2 µg/L, ammonium molybdate tetrahydrate: 18 µg/L). A simulated contaminated seawater 1 was prepared by adding, as cesium concentration, 0.5 mg/L of cesium chloride into the aqueous solution.

[Passing of Simulated Contaminated Seawater 1 Through Columns]

Each glass column with an inner diameter of 30 mm was filled with 10 mL of the silicotitanate molded bodies prepared in Example 2 as an adsorbent at the layer height of 1.4 cm, and the simulated contaminated seawater 1 was passed through the glass column downward at a flow rate of 11.5 mL/min (linear velocity LV=1.6 m/h, space velocity SV=70 $h^{-1}$), 23.5 mL/min (linear velocity LV=3.4 m/h, space velocity SV=140 $h^{-1}$), or 47.0 mL/min (linear velocity LV=6.7 m/h, space velocity SV=280 $h^{-1}$). The treated water was regularly collected at each column outlet and measured for cesium and strontium concentrations by ICP-MS. Decontamination was considered to be completed when a value of cesium and strontium concentrations (C) in the treated water at the column outlet divided by the respective initial cesium and strontium concentrations ($C_0$) in the simulated contaminated seawater 1 reaches 0.1.

Figure 4:
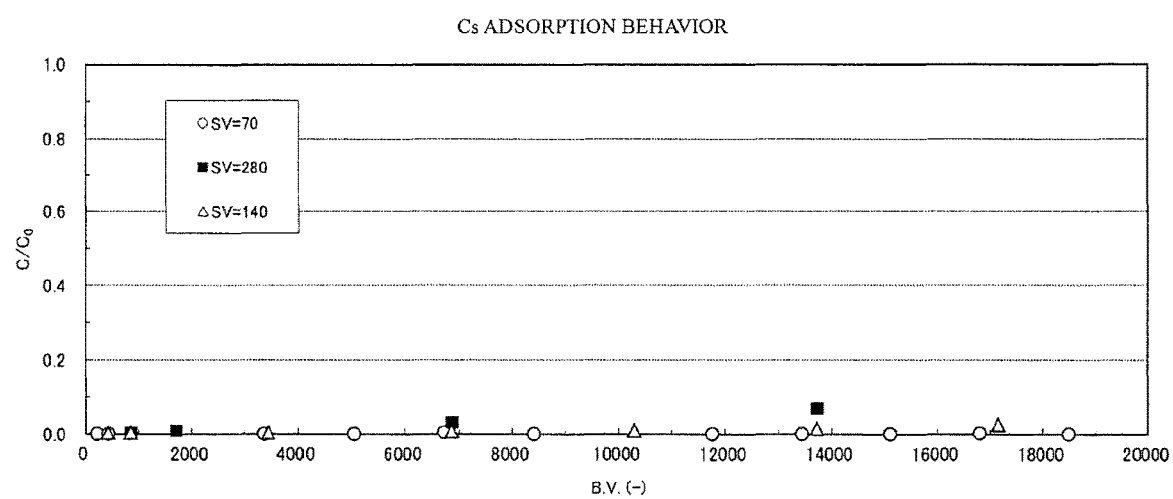
FIG. 4 is a graph showing cesium removal performance of an adsorbent of the present invention in Example 9.
Figure 5:
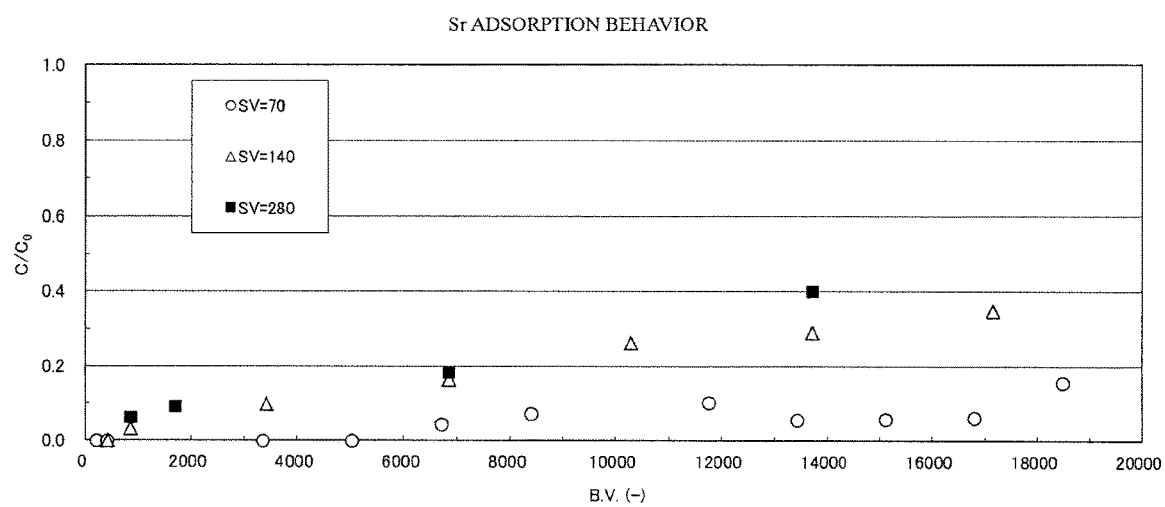
FIG. 5 is a graph showing strontium removal performance of the adsorbent of the present invention in Example 9.

The cesium removal performance is shown in FIG. 4, and the strontium removal performance is shown in FIG. 5. In FIGS. 4 and 5, the horizontal axis is B.V. indicating that the simulated contaminated seawater in what times the volume of the adsorbent is passed through, whereas the vertical axis is a value of the cesium and strontium concentration (C) at the column outlet divided by the cesium and strontium concentration ($C_0$) at the column inlet, respectively.

FIGS. 4 and 5 reveal that the silicotitanate molded bodies of the present invention exhibit remarkably excellent adsorption capacity despite the space velocity SV in an extremely high range of 70 $h^{-1}$ or more and 280 $h^{-1}$ or less as a column flow rate of the simulated contaminated seawater 1.

Example 10

[Preparation of Simulated Contaminated Seawater 2]

An aqueous solution with a salt concentration of 0.17 wt % was prepared by using a chemical for artificial seawater production, MARINE ART SF-1 from Osaka Yakken Co., Ltd. (sodium chloride: 22.1 g/L, magnesium chloride hexahydrate: 9.9 g/L, calcium chloride dihydrate: 1.5 g/L, anhydrous sodium sulfate: 3.9 g/L, potassium chloride: 0.61 g/L, sodium hydrogen carbonate: 0.19 g/L, potassium bromide: 96 mg/L, borax: 78 mg/L, anhydrous strontium chloride: 13 mg/L, sodium fluoride: 3 mg/L, lithium chloride: 1 mg/L, potassium iodide: 81 µg/L, manganese chloride tetrahydrate: 0.6 µg/L, cobalt chloride hexahydrate: 2 µg/L, aluminum chloride hexahydrate: 8 µg/L, ferric chloride hexahydrate: 5 µg/L, sodium tungstate dihydrate: 2 µg/L, ammonium molybdate tetrahydrate: 18 µg/L). A simulated contaminated seawater 2 was prepared by adding, as cesium concentration, 1.0 mg/L of cesium chloride into the aqueous solution.

[Passing of Simulated Contaminated Seawater 2 Through Columns]

Each glass column with an inner diameter of 16 mm was filled with 200 mL of the silicotitanate molded bodies prepared in Example 3 as an adsorbent at the layer height of 100 cm, and the simulated contaminated seawater 2 was passed through the glass column downward at a flow rate of 66.5 mL/min (linear velocity LV=20 m/h, space velocity SV=20 $h^{-1}$). The treated water was regularly collected at the column outlet and measured for cesium and strontium concentrations by ICP-MS. Decontamination was considered to be completed when a value of cesium and strontium concentrations (C) in the treated water at the column outlet divided by the respective initial cesium and strontium concentrations ($C_0$) in the simulated contaminated seawater 2 reaches 0.1.

Figure 6:
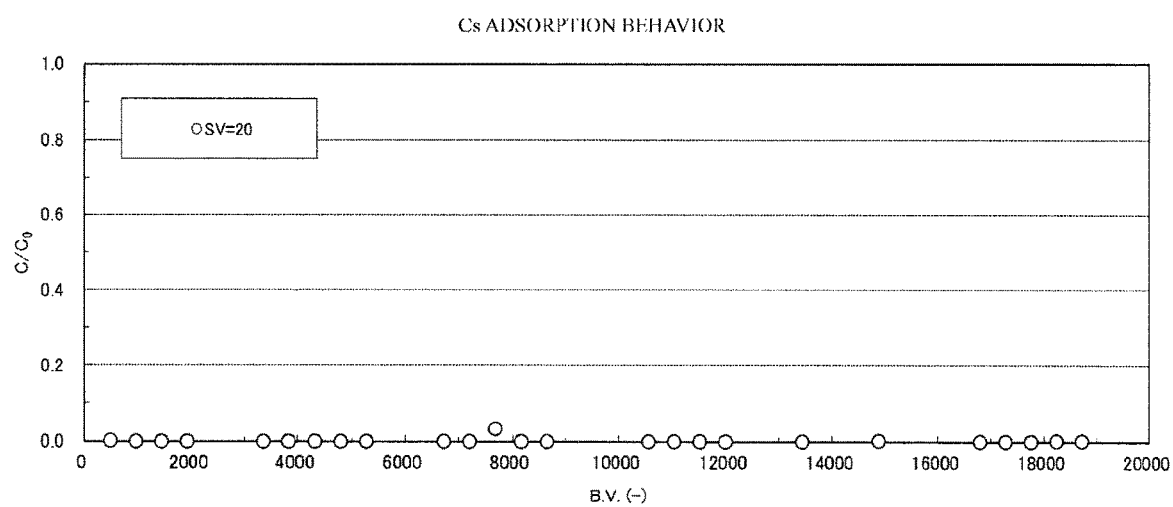
FIG. 6 is a graph showing cesium removal performance of an adsorbent of the present invention in Example 10.
Figure 7:
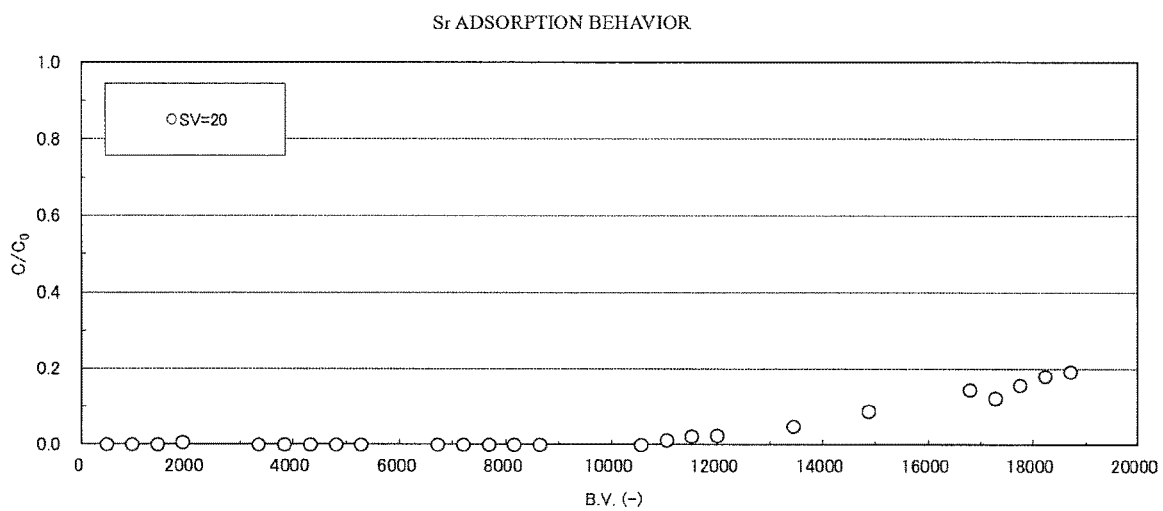
FIG. 7 is a graph showing strontium removal performance of the adsorbent of the present invention in Example 10.

The cesium removal performance is shown in FIG. 6, and the strontium removal performance is shown in FIG. 7. In FIGS. 6 and 7, the horizontal axis is B.V. indicating that the simulated contaminated seawater in what times the volume of the adsorbent is passed through, whereas the vertical axis is a value of the cesium and strontium concentrations (C) at the column outlet divided by the cesium and strontium concentrations ($C_0$) at the column inlet, respectively.

FIGS. 6 and 7 reveal that the silicotitanate molded bodies of the present invention exhibit excellent adsorption performance for cesium and strontium even in a waste solution with a high salt concentration.

The invention claimed is:

1. A silicotitanate molded body comprising:
   crystalline silicotitanate particles that have a particle size distribution in which 90% or more, on volume basis, of the particles have a particle size within a range of 1 µm or more and 10 µm or less and that are represented by a general formula of $A_2Ti_2O_3(SiO_4).nH_2O$ wherein A represents one or two alkali metal elements selected from Na and K, and n represents a number of 0 to 2; and
   an oxide of one or more elements selected from the group consisting of aluminum, zirconium, iron, and cerium.

2. The silicotitanate molded body according to claim 1, further comprising niobium.

3. The silicotitanate molded body according to claim 2, wherein the silicotitanate molded body has a compressive strength at failure of 5.0 N or more.

4. The silicotitanate molded body according to claim 1, wherein a content of the oxide of one or more elements selected from the group of aluminum, zirconium, iron, and cerium is 20 wt % or less.

5. The silicotitanate molded body according to claim 1, wherein the molded body has a cylindrical shape having an average diameter within a range of 300 µm or more and 3,000 µm or less.

6. An adsorbent for cesium and/or strontium, comprising the silicotitanate molded body according to claim 1.

7. A decontamination method of a radioactive waste solution, comprising bringing an adsorbent for cesium and/or strontium comprising the silicotitanate molded body according to claim 1 into contact with a waste solution containing radioactive cesium and/or radioactive strontium.

8. The decontamination method of a radioactive waste solution according to claim 7, comprising bringing the radioactive waste solution into contact with the adsorbent in a column flow mode at a linear velocity LV of 2 m/h or more and 40 m/h or less and a space velocity SV of 10 $h^{-1}$ or more and 300 $h^{-1}$ or less.

9. A production method of the silicotitanate molded body according to claim 1, comprising:
   extruding a mixture containing crystalline silicotitanate that has a particle size distribution in which 90% or more, on volume basis, of particles have a particle size within a range of 1 µm or more and 10 µm or less and that is represented by a general formula of $A_2Ti_2O_3(SiO_4).nH_2O$ wherein A represents one or two alkali metal elements selected from Na and K, and n represents a number of 0 to 2; and an oxide of one or more elements selected from the group consisting of aluminum, zirconium, iron, and cerium to form a molded body; and subsequently drying the molded body.

10. An adsorbent for cesium and/or strontium, comprising the silicotitanate molded body according to claim 2.

11. An adsorbent for cesium and/or strontium, comprising the silicotitanate molded body according to claim 3.

12. An adsorbent for cesium and/or strontium, comprising the silicotitanate molded body according to claim 4.

13. An adsorbent for cesium and/or strontium, comprising the silicotitanate molded body according to claim 5.

14. A decontamination method of a radioactive waste solution, comprising bringing an adsorbent for cesium and/or strontium comprising the silicotitanate molded body according to claim 2 into contact with a waste solution containing radioactive cesium and/or radioactive strontium.

15. A decontamination method of a radioactive waste solution, comprising bringing an adsorbent for cesium and/or strontium comprising the silicotitanate molded body according to claim 3 into contact with a waste solution containing radioactive cesium and/or radioactive strontium.

16. A decontamination method of a radioactive waste solution, comprising bringing an adsorbent for cesium and/or strontium comprising the silicotitanate molded body according to claim 4 into contact with a waste solution containing radioactive cesium and/or radioactive strontium.

17. A decontamination method of a radioactive waste solution, comprising bringing an adsorbent for cesium and/or strontium comprising the silicotitanate molded body according to claim 5 into contact with a waste solution containing radioactive cesium and/or radioactive strontium.

18. A production method of the silicotitanate molded body according to claim 2, comprising:

extruding a mixture containing crystalline silicotitanate that has a particle size distribution in which 90% or more, on volume basis, of particles have a particle size within a range of 1 µm or more and 10 µm or less and that is represented by a general formula of $A_2Ti_2O_3(SiO_4) \cdot nH_2O$ wherein A represents one or two alkali metal elements selected from Na and K, and n represents a number of 0 to 2; and an oxide of one or more elements selected from the group consisting of aluminum, zirconium, iron, and cerium to form a molded body; and subsequently drying the molded body.

19. A production method of the silicotitanate molded body according to claim 3, comprising:

extruding a mixture containing crystalline silicotitanate that has a particle size distribution in which 90% or more, on volume basis, of particles have a particle size within a range of 1 µm or more and 10 µm or less and that is represented by a general formula of $A_2Ti_2O_3(SiO_4) \cdot nH_2O$ wherein A represents one or two alkali metal elements selected from Na and K, and n represents a number of 0 to 2; and an oxide of one or more elements selected from the group consisting of aluminum, zirconium, iron, and cerium to form a molded body; and subsequently drying the molded body.

20. A production method of the silicotitanate molded body according to claim 4, comprising:

extruding a mixture containing crystalline silicotitanate that has a particle size distribution in which 90% or more, on volume basis, of particles have a particle size within a range of 1 µm or more and 10 µm or less and that is represented by a general formula of $A_2Ti_2O_3(SiO_4) \cdot nH_2O$ wherein A represents one or two alkali metal elements selected from Na and K, and n represents a number of 0 to 2; and an oxide of one or more elements selected from the group consisting of aluminum, zirconium, iron, and cerium to form a molded body; and subsequently drying the molded body.

21. A production method of the silicotitanate molded body according to claim 5, comprising:

extruding a mixture containing crystalline silicotitanate that has a particle size distribution in which 90% or more, on volume basis, of particles have a particle size within a range of 1 µm or more and 10 µm or less and that is represented by a general formula of $A_2Ti_2O_3(SiO_4) \cdot nH_2O$ wherein A represents one or two alkali metal elements selected from Na and K, and n represents a number of 0 to 2; and an oxide of one or more elements selected from the group consisting of aluminum, zirconium, iron, and cerium to form a molded body; and subsequently drying the molded body.

* * * * *